US008731245B2

(12) United States Patent
Shin et al.

(10) Patent No.: US 8,731,245 B2
(45) Date of Patent: May 20, 2014

(54) MULTIPLE VIEW TRANSPORTATION IMAGING SYSTEMS

(75) Inventors: Helen HaeKyung Shin, Fairpoint, NY (US); Robert P. Loce, Webster, NY (US); Wencheng Wu, Webster, NY (US); Thomas F. Wade, Rochester, NY (US); Peter Paul, Webster, NY (US); Edgar Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 181 days.

(21) Appl. No.: 13/414,167

(22) Filed: Mar. 7, 2012

(65) Prior Publication Data

US 2013/0236063 A1 Sep. 12, 2013

(51) Int. Cl.
*G06K 9/00* (2006.01)

(52) U.S. Cl.
USPC .......... 382/105

(58) Field of Classification Search
None
See application file for complete search history.

(56) References Cited

U.S. PATENT DOCUMENTS

| | | | | |
|---|---|---|---|---|
| 4,893,183 | A | 1/1990 | Nayar | |
| 6,586,382 | B1 | 7/2003 | Stone | |
| 6,762,871 | B2 | 7/2004 | Yoshimura | |
| 7,551,067 | B2 * | 6/2009 | Otsuka et al. | 340/436 |
| 7,646,526 | B1 | 1/2010 | Wang et al. | |
| 7,679,808 | B2 | 3/2010 | Kim | |
| 7,894,117 | B2 | 2/2011 | Finlayson | |
| 2004/0263957 | A1 * | 12/2004 | Hirahara et al. | 359/372 |
| 2009/0046346 | A1 | 2/2009 | Finlayson | |
| 2009/0231273 | A1 * | 9/2009 | Lashina et al. | 345/156 |
| 2010/0039692 | A1 | 2/2010 | Yamada et al. | |
| 2010/0128127 | A1 * | 5/2010 | Ciolli | 348/143 |
| 2010/0165437 | A1 | 7/2010 | Tonar et al. | |
| 2010/0202036 | A1 | 8/2010 | Minor et al. | |
| 2011/0211040 | A1 * | 9/2011 | Lindemann et al. | 348/36 |

FOREIGN PATENT DOCUMENTS

| | | | | |
|---|---|---|---|---|
| JP | 09178920 | A * | 7/1997 | G02B 5/08 |

OTHER PUBLICATIONS

Obstacle Detection using a Single Camera Stereo Sensor. Luc Duvieubourg, Sebastien Ambellouis, Sebastien Lefebvre and Francois Cabestaing. SITIS 2007.*
"Rectified Catadioptric Stereo Sensors", IEEE Transaction on Pattern Analysis and Machine Intelligence, vol. 24. No. 2, Feb. 2002.
"Switchable Mirror Glass Produced for Energy Efficient Windowns", http://www.physorg.com/news89369874.html, Jan. 30, 2007.
http://www.kentoptronic.com/mirror.html (retrieved Mar. 6, 2012).

* cited by examiner

*Primary Examiner* — Stephen R Koziol
*Assistant Examiner* — Delomia Gilliard
(74) *Attorney, Agent, or Firm* — MH2 Technology Law Group LLP

(57) ABSTRACT

A camera may be positioned to have a direct view of oncoming vehicle traffic from a first perspective. Additionally, a reflective surface, such as a mirror, may be positioned within the viewing area of the same camera to provide the camera with a reflected view of vehicle traffic from a second perspective. The images recorded by the camera may then be received by a computing device. The computing device may separate the images into a direct view region and a reflected view region. After separation, the regions may be analyzed independently and/or combined with other regions, and the analyzed data may be stored. The regions may be analyzed to determine various vehicle characteristics, including, but not limited to, vehicle speed, license plate identification, vehicle occupancy, vehicle count, and vehicle type.

19 Claims, 13 Drawing Sheets

MULTIPLE VIEW TRANSPORTATION IMAGING SYSTEMS

TECHNICAL FIELD

The present disclosure relates generally to methods, systems, and computer-readable media for monitoring objects, such as vehicles in traffic, from multiple, different optical perspectives using a single-camera architecture.

BACKGROUND

Traffic cameras are frequently used to assist law enforcement personnel in enforcing traffic laws and regulations. For example, traffic cameras may be positioned to record passing traffic, and the recordings may be analyzed to determine various vehicle characteristics, including vehicle speed, passenger configuration, and other characteristics relevant to traffic rules. Typically, in addition to detecting characteristics related to compliance with traffic rules, traffic cameras are also tasked with recording and analyzing license plates in order to associate detected characteristics with specific vehicles or drivers.

However, law enforcement transportation cameras are often positioned with a view that is suboptimal for multiple applications. As an example, law enforcement transportation cameras may be tasked with both determining the speed of a passing vehicle and capturing the license plate information of the same vehicle for identification purposes. Regulations typically require that license plates be located on the front and/or rear portion of vehicles. As a result, an optimum position for capturing vehicle license plates may be to place the camera such that it has a substantially direct view of either the front portion of an approaching vehicle or the rear portion of a passing vehicle. However, as described below, a direct view of the front or rear portion of a vehicle may not be an optimal view for determining other vehicle characteristics, such as vehicle speed.

For example, as depicted in FIG. 1A, multiple images 110-113 of a vehicle 130 may be captured over a period of time. The speed of vehicle 130 may be determined by analyzing changes 120 in the position of a fixed feature of the vehicle (e.g., its roofline), or by analyzing changes in the size of the vehicle, over time.

However, even if vehicle 130 approaches the camera at a constant speed, such changes in position or size may not occur in a linear manner. Rather, changes in vehicle size or feature position may occur at slower rates when vehicle 130 is far from the camera but at faster rates when vehicle 130 is near to the camera. Similarly, the rate of change may depend on the size of the vehicle. As a result, speed calculations based on images of the front or rear portion of a vehicle, as depicted in FIG. 1A, may need to make certain geometric assumptions, such as vehicle distance or size, in order to control for geometric distortion. And the accuracy of speed calculations will depend on the accuracy of those geometric assumptions.

Similarly, the accuracy of speed determinations may also depend on the accuracy with which a vehicle a particular feature of vehicle 130 is tracked across images. For example, as depicted in FIG. 1A, the change in the size of vehicle 130 as it approaches the camera may be measured by referencing the change in position of a particular feature, such as its roofline or license plate 131. Thus, errors in identifying the same feature across multiple images may also affect the accuracy of speed determinations based thereon.

As a general matter, speed calculations based on rear or frontal views of a vehicle tend to be more susceptible to inaccuracy due to the limitations imposed by the geometric configuration than to errors in tracking vehicle features across images. By contrast, speed calculations based on top-down views of a vehicle tend to be less susceptible to inaccuracy due to the particular geometric configuration being used but more susceptible to errors in tracking vehicle features due to height variations between different vehicles.

For example, as depicted in FIG. 1B, the speed of a vehicle 160 may be determined by measuring the change in lateral position of a fixed feature of the vehicle (e.g., its front bumper) over time, as viewed from a top-down perspective. In some cases, provided that the camera is positioned at an adequate distance from the road, the size of vehicle 160 in each sequential image will change only slightly as it passes through the camera's field of view. As a result, the effect of the geometric configuration on speed calculations from a top-down perspective may be smaller than that of the perspective depicted in FIG. 1A. By contrast, the accuracy of speed calculations may be more susceptible to errors in tracking the same feature of vehicle 160 across different images due to height variations between different vehicles. Moreover, as can be seen, the license plate 161 of vehicle 160 may not be viewable from a top-down view. Similar issues may arise when analyzing sequential images taken of the side portion of a vehicle, which may further be complicated by potential occlusion by the presence of other vehicles.

Given the different challenges of capturing and analyzing vehicle images from a frontal or rear perspective versus a top-down (or side) perspective, one possible enhancement may be to use multiple cameras positioned at different locations such that images of a single vehicle may be captured from multiple, different perspectives. However, such multi-camera systems may impose higher overhead costs due to increased power consumption, increased complexity due to a potential need for temporal and spatial alignment of the imagery, increased communication infrastructure, the need for additional installation and operation permits, and maintenance, among other costs.

Consequently, transportation imaging systems may be improved by techniques for using a single camera to record traffic information from multiple, different optical perspectives simultaneously.

SUMMARY OF THE INVENTION

The present disclosure presents these and other improvements to automated transportation imaging systems. In some embodiments, a camera may be positioned to have a direct view of on-coming vehicle traffic from a first perspective. Additionally, a reflective surface, such as a mirror, may be positioned within the viewing area of the same camera to provide the camera with a reflected view of vehicle traffic from a second perspective.

The images recorded by the camera may then be received by a computing device. The computing device may separate the images into a direct view region and a reflected view region. After separation, the regions may be analyzed independently and/or combined with other regions, and the analyzed data may be stored. The regions may be analyzed to determine various vehicle characteristics, including, but not limited to, vehicle speed, license plate identification, vehicle occupancy, vehicle count, and vehicle type.

The present disclosure may be preferable over multiple-camera implementations by virtue of imposing lower overhead power consumption, less communication infrastructure, fewer installation and operation permit requirements, less maintenance, less space requirements, and looser or no synchronization requirements between cameras, among other benefits. Additionally, the present disclosure may effectively combine analytics from multiple views to produce more accurate results and may be less susceptible to view blocking.

Furthermore, in some embodiments, a single-camera multiple-view system may be capable of capturing frames using identical system parameters. Accordingly, lens, sensor (e.g. charge-coupled device (CCD) or complementary metal-oxide semiconductor (CMOS)), and digitizer parameters, such as blurring, lens distortions, focal length, response, and gain/offset pixel size, may be identical for the multiple capture angles. Moreover, because only one camera is used, only one set of intrinsic calibration parameters may be required.

BRIEF DESCRIPTION OF THE DRAWINGS

The accompanying drawings, which are incorporated in and constitute a part of this specification, illustrate various embodiments of the present disclosure and together, with the description, serve to explain the principles of the present disclosure. In the drawings.

DETAILED DESCRIPTION

Figure 1A:
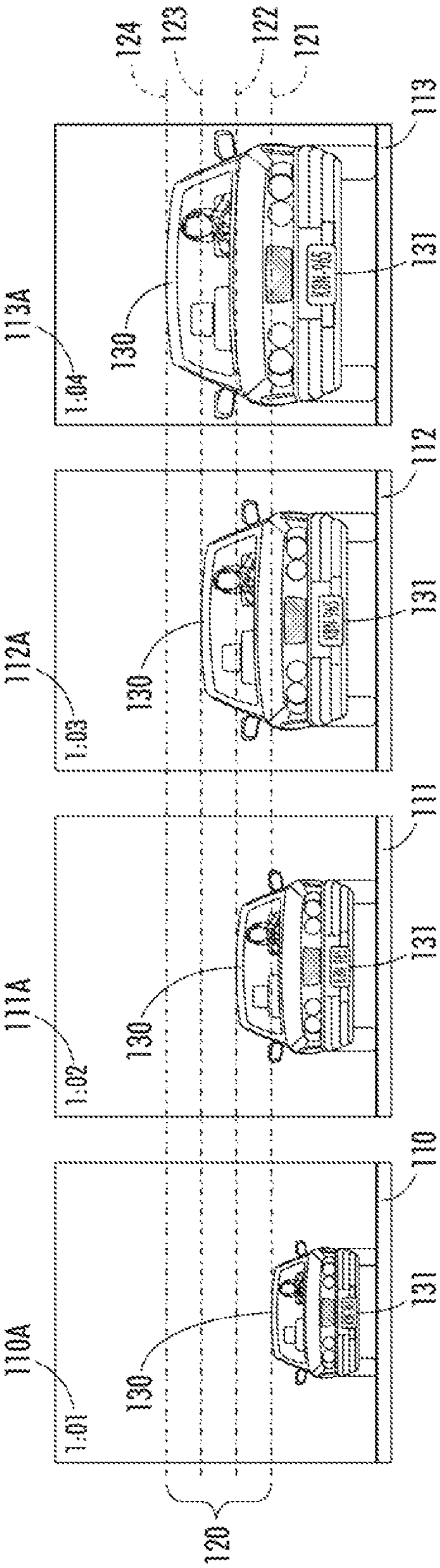
FIG. 1A is a diagram depicting a sequence of images that may be captured by a camera with a view of the front portion of a vehicle.
Figure 1B:
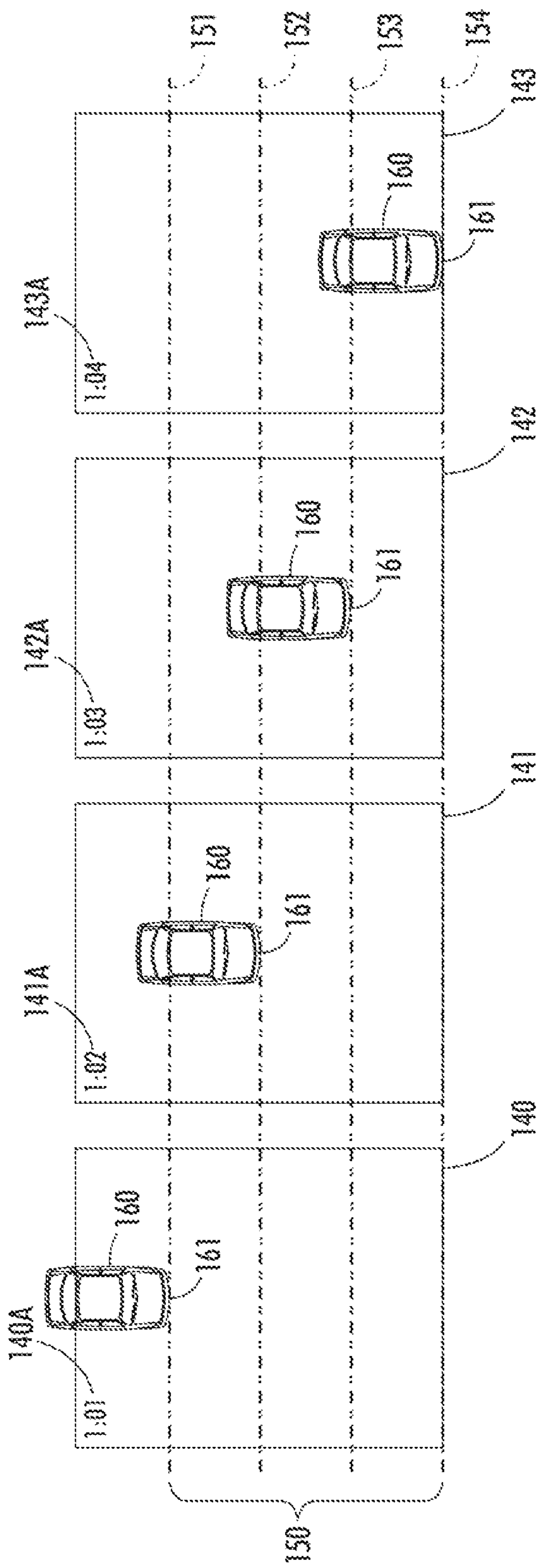
FIG. 1B is a diagram depicting a sequence of images that may be captured by a camera with a view of the top portion of a vehicle.

The following detailed description refers to the accompanying drawings. Wherever possible, the same reference numbers are used in the drawings and the following description to refer to the same or similar parts. While several exemplary embodiments and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

In the description and claims, unless otherwise specified, the following terms may have the following definitions.

A view may refer to an optical path of a camera's field of view. For example, a direct view may refer to a camera receiving light rays from an object that it is recording such that the light rays travel from the object to the camera structure in an essentially linear manner—i.e., without bending due to reflection off of a surface or being refracted to a non-negligible degree from devices or media other than the camera's integrated lens assembly. Similarly, a reflected view may refer to such light rays traveling from the object to the camera structure by reflecting off of a surface, and a refracted view may refer to the light rays bending by refraction in order to reach the camera structure by devices or media other than the camera's integrated lens assembly.

A perspective may refer to the orientation of the view of a camera (whether direct, reflected, refracted, or otherwise) with respect to an object or plane. For example, a camera may be provided with a view of traffic from a vertical perspective, which may be substantially perpendicular to a horizontal surface, such as a road (e.g., more perpendicular than parallel to the surface). Thus, in some embodiments, a vertical perspective may enable the camera to view traffic from a "top-down" perspective from which it can capture images of the road and the top portions of vehicles traveling on the road. In this application, the term "top-down perspective" may also be used as a synonym for "vertical perspective."

By contrast, a lateral perspective may refer to an optical perspective that is substantially parallel to a horizontal surface (e.g., more parallel than perpendicular to the surface). Thus, in some embodiments, a lateral perspective may enable the camera to view traffic from a frontal, side, or rear perspective.

An image may refer to a graphical representation of one or more objects, as captured by a camera, by intercepting light rays originating or reflecting from those objects, and embodied into non-transient form, such as a chemical imprint on a physical film or a binary representation in computer memory. In some embodiments, an image may refer to an individual image, a sequence of consecutive images, a sequence of related non-consecutive images, or a video segment that may be captured by a camera. In some embodiments, an image may refer to one or more consecutive images depicting a vehicle in motion captured by a camera from one perspective using a particular view. Additionally, in some embodiments, a first image and a second image, which may be analyzed separately using techniques described below, may contain overlapping sequences of individual images or may contain no overlapping individual images.

A region may refer to a section or a subsection of an image. In some embodiments, an image may comprise two or more different regions, each of which represents a different optical perspective of a camera using a different view. Additionally, in some embodiments, a region may be extracted from an image and stored as a separate image.

An area may refer to a section or a subsection of a region. In some embodiments, an area may represent a section of a region that depicts a particular portion of a vehicle (e.g., license plate, cabin, roof, etc.) the isolation of which may be useful for determining particular vehicle characteristics. Additionally, in some embodiments, an area may be extracted from a region and stored as a separate image.

An aligned image may refer to a set of associated images, regions, or areas that depict the same vehicle (or portions thereof) from multiple, different perspectives or using different views. For example, an aligned image may refer to two associated regions; the first region may represent a direct view of a vehicle at a first time, and the second region may represent a reflected view of the same vehicle at a second time.

Figure 2A:
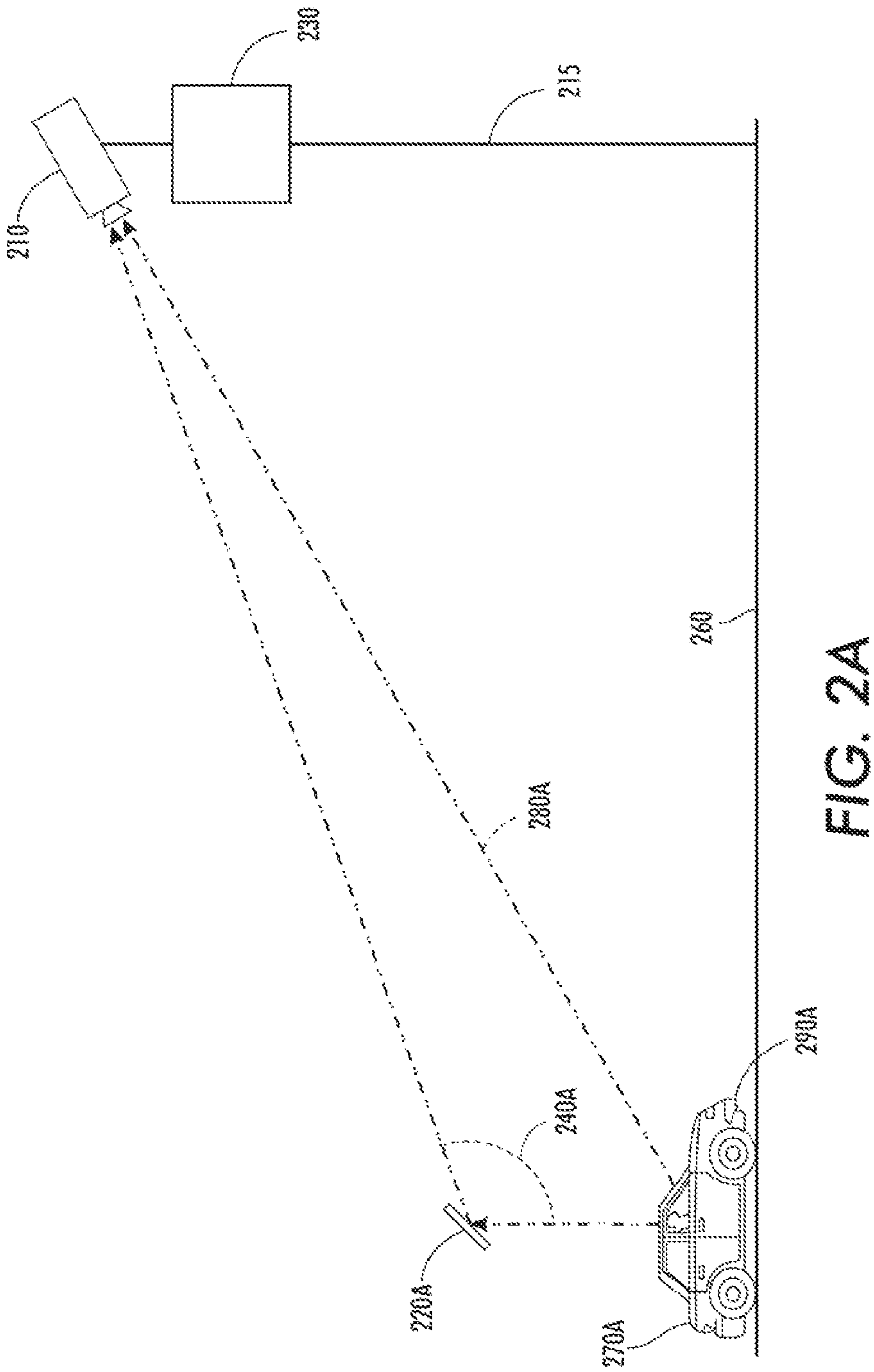
FIG. 2A is a diagram depicting an exemplary multiple-view transportation imaging system using a single-camera architecture, consistent with certain disclosed embodiments.

FIG. 2A is a diagram depicting an exemplary multiple-view transportation imaging system using a single-camera architecture, consistent with certain disclosed embodiments. As depicted in FIG. 2A, a single camera 210 and a computing device 230 may be elevated and mounted on a structure. For example, camera 210 may be elevated above a road 260 and mounted by a pole 215. Additionally, a mirror 220A may be positioned within the direct view of camera 210.

Camera 210 may represent any type of camera or viewing device capable of capturing or conveying image data with respect to external objects. Mirror 220A may represent any type of surface capable of reflecting or refracting light such that it may provide camera 210 with an optical view other than a direct optical view. In some embodiments, mirror 220A may represent one or more different types and sizes of mirrors, including, but not limited to, planar, convex and aspheric.

As depicted in FIG. 2A, a vehicle 270A may be traveling on a road 260, and a license plate 290A may be attached to the front portion of vehicle 270A. Camera 210 may be oriented to have a direct view 280A of the front portion of vehicle 270A from a lateral perspective. Additionally, mirror 220A may be positioned and oriented so as to provide camera 210 with a reflected view 240A of the top portion of vehicle 270A from a top-down perspective. Thus, a single camera may simultaneously capture images of vehicle 270A from two different perspectives.

Those skilled in the art will appreciate that the configuration depicted in FIG. 2A is exemplary only, as other configurations may be utilized to provide camera 210 with multiple, different perspectives with respect to one or more vehicles using multiple, different views. For example, in other embodiments, camera 210 could be positioned so as to have a direct view of the top portion of vehicle 270A from a vertical perspective. Mirror 220A could also be positioned so as to provide camera 210 with a reflected view of a front, rear, or side portion of vehicle 270A from a lateral perspective.

Similarly, in other embodiments, mirror 220A could be positioned so as to provide camera 210 with a direct view of the front portion of vehicle 270A from a first lateral perspective and reflected view of the rear portion of vehicle 270A from a second lateral perspective. In still other embodiments, two mirrors could be utilized so as to provide camera 210 with only reflected views, each reflected view utilizing a different perspective and/or capturing images of different portions of vehicle 270A. In some embodiments, FIG. 2A may represent the technique of using one or more reflective surfaces (or refractive media) external to camera 210 to simultaneously provide camera 210 with multiple, different optical perspectives with respect to a single vehicle 270A.

Additionally, although camera 210 is depicted as being positioned on top of pole 215, in other embodiments, camera 210 may be positioned at different heights or may be connected to different structures. Accordingly, pole 215 may represent any structure or structures capable of supporting camera 210 and/or mirror 220A. In some embodiments, mirror 220A may be connected to structure 215 and/or camera 210, or mirror 220A may be connected to a separate structure or structures. In some embodiments, camera 210 and/or mirror 220A may be positioned at or nearer to ground level.

Figure 2B:
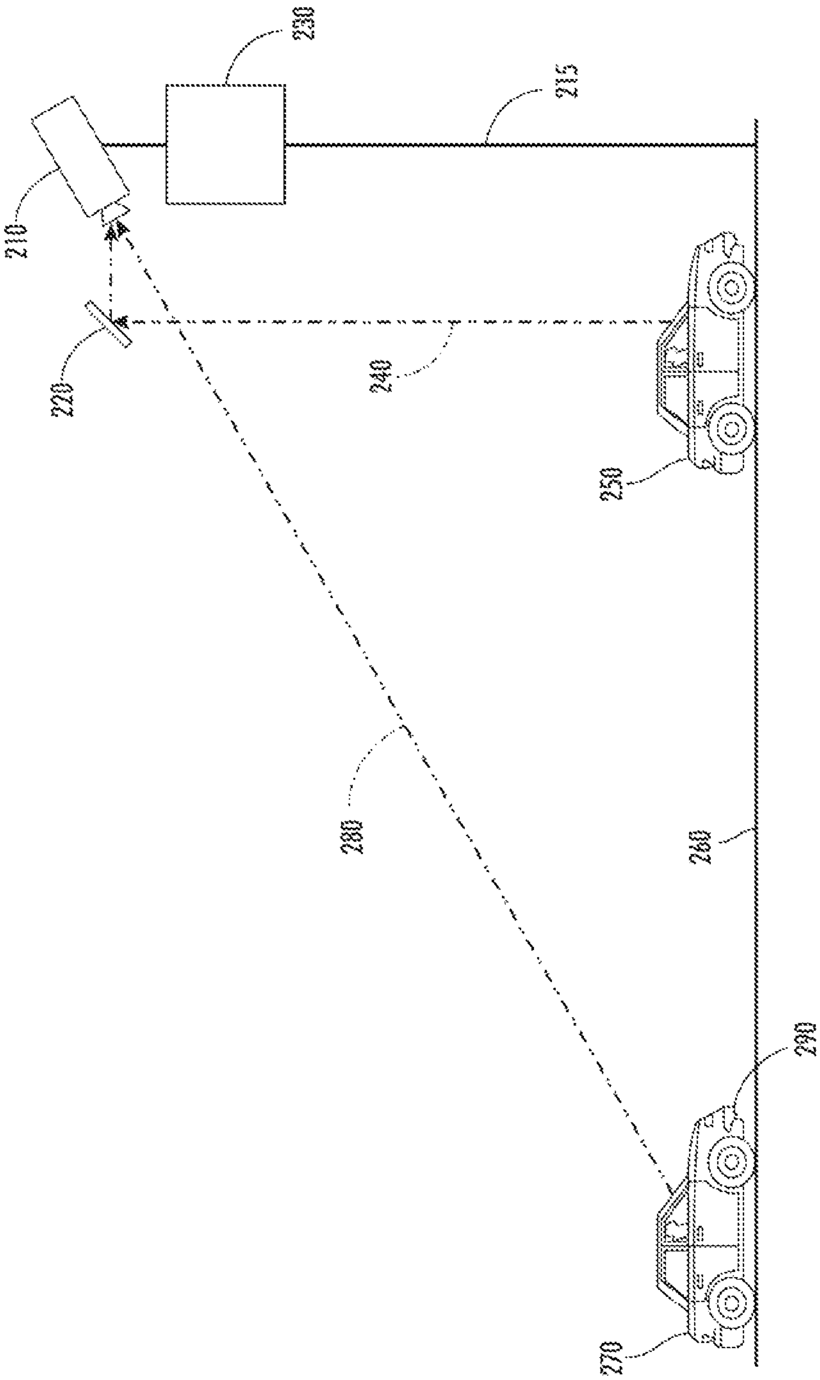
FIG. 2B is a diagram depicting an exemplary multiple-view transportation imaging system using a single-camera architecture, consistent with certain disclosed embodiments.

FIG. 2B is a diagram depicting an exemplary multiple-view transportation imaging system using a single-camera architecture, consistent with certain disclosed embodiments. As depicted in FIG. 2B, a single camera 210 and a computing device 230 may be elevated and mounted on a structure. For example, camera 210 may be elevated by and mounted on pole 215. Additionally, a mirror 220 may be positioned within the direct view of camera 210. In some embodiments, mirror 220 may be mounted on the same structure 215 as camera 210.

As depicted in FIG. 2B, a first vehicle 270 and a second vehicle 250 are traveling on road 260, and a license plate 290 is attached to the front portion of vehicle 270. Camera 210 may be oriented to have a direct view 280 of the front portion of vehicle 270 from a lateral perspective. Additionally, mirror 220 may be positioned and oriented so as to provide camera 210 with a reflected view 240 of the top portion of vehicle 250 from a vertical or top-down perspective. Thus, a single camera may simultaneously capture images of vehicle traffic from two different perspectives.

Furthermore, vehicle 270 may travel on road 260 in the direction of the position of vehicle 250. Thus, eventually, vehicle 270 may move into the position formerly occupied by vehicle 250. At that subsequent time, camera 210 may capture an image of the top portion of vehicle 270 using reflected view 240. Accordingly, camera 210 may capture images of both the front portion of vehicle 270, using direct view 280, and the top portion of vehicle 270, using reflected view 240, albeit at different times.

Similar to FIG. 2A, the configuration depicted in FIG. 2B is exemplary only, as other configurations may be utilized to provide camera 210 with views of one or more vehicles at multiple, different locations. For example, in other embodiments, camera 210 could be positioned so as to have a direct view of the top of vehicle 270 from a vertical perspective. Mirror 220 could also be positioned so as to provide camera 210 with a reflected view of the rear portion of vehicle 250 from a lateral perspective. Similarly, in other embodiments, mirror 220 could be positioned so as to allow camera 210 a direct view of the front portion of vehicle 270 from a first lateral perspective and provide a reflected view of the rear portion of vehicle 250 from a second lateral perspective.

FIG. 2B depicts a situation in which a vehicle is visible in both direct view 280 and reflected view 240 at the same time. However, in the configuration of FIG. 2B, there may be times when a vehicle can be seen in direct view 280 while no vehicle is in reflected view 240, or vice-versa.

Figure 3A:
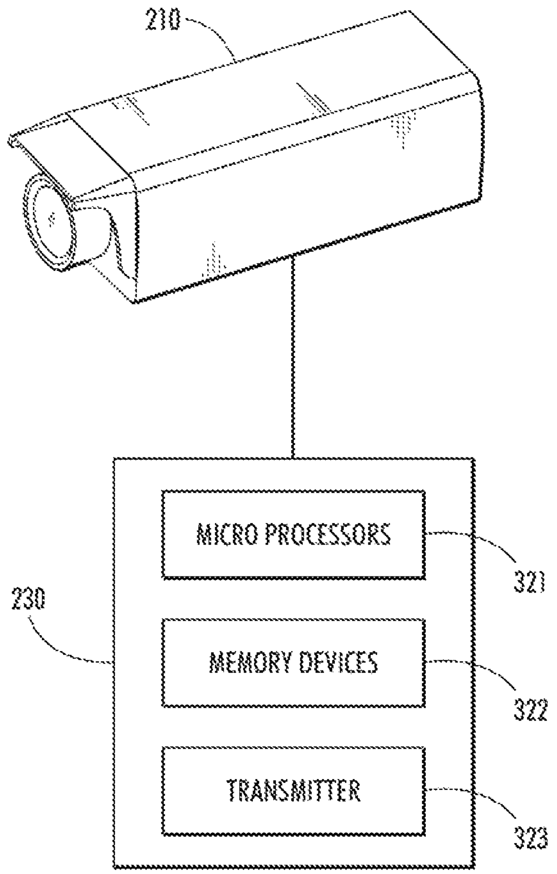
FIG. 3A is a diagram depicting an exemplary device configuration that may be used as part of a multiple-view transportation imaging system, consistent with certain disclosed embodiments.

FIG. 3A is a diagram depicting an exemplary device configuration that may be used as part of a multiple-view transportation imaging system, consistent with certain disclosed embodiments. As described above, camera 210 may represent any type of camera or viewing device capable of capturing or conveying image data with respect to external objects.

Device 230 may represent any computing device capable of receiving, storing, and/or analyzing image data captured by one or more cameras 210 using one or more of the image analysis techniques described herein, such as the techniques described with respect to FIGS. 4 through 8B. Although depicted in FIG. 3A as being separate from camera 210, in some embodiments, device 230 may be part of the same device as camera 210. Moreover, although device 230 is depicted as being mounted to structure 215 in FIGS. 2A and 2B, in various other embodiments device 230 may be positioned at or near ground level, on a different structure, or at a remote location.

Device 230 may include, for example, one or more microprocessors 321 of varying core configurations and clock frequencies; one or more memory devices or computer-readable media 322 of varying physical dimensions and storage capacities, such as flash drives, hard drives, random access memory, etc., for storing data, such as images, files, and program instructions for execution by one or more microprocessors 321; one or more transmitters 323 for communicating over network protocols, such as Ethernet, code divisional multiple access (CDMA), time division multiple access (TDMA), etc. Components 321, 322, and 323 may be part of a single device as disclosed in FIG. 3A or may be contained within multiple devices. Those skilled in the art will appreciate that the above-described componentry is exemplary only, as device 230 may comprise any type of hardware componentry, including any necessary accompanying firmware or software, for performing the disclosed embodiments.

Figure 3B:
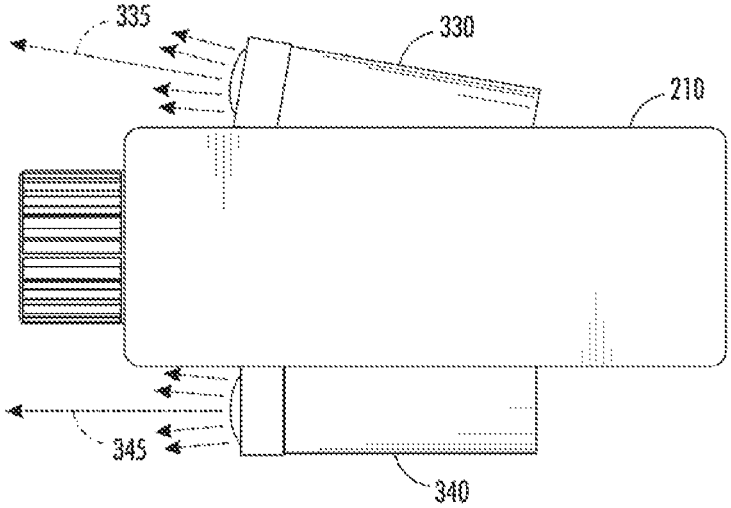
FIG. 3B is a diagram depicting an exemplary illumination configuration that may be used as part of a multiple-view transportation imaging system, consistent with certain disclosed embodiments.

In some embodiments, a multiple-view transportation imaging system may also be equipped with special illumination componentry to aid in capturing traffic images from multiple, different optical perspectives simultaneously. For example, as depicted in FIG. 3B, in some embodiments, camera 210 may be equipped with a first illumination device 330 that shines light substantially in the direction of a first line of incidence 335 and a second illumination device 340 that shines light substantially in the direction of a second, different line of incidence 345. The different illumination devices 330 and 340 may be positioned and oriented such that their respective lines of incidence provide illumination for or along different optical perspectives viewable by camera 210.

For example, the illumination assembly of FIG. 3B could be used in the embodiment depicted in FIG. 2B, such that illumination device 330 shines light along a line of incidence 335 that substantially tracks or parallels optical perspective 240. As a result, illumination device 330 may shine light such that it proceeds from camera 210, reflects off of mirror 220, and ultimately illuminates the top portion of vehicle 250. Similarly, illumination device 340 may shine light along a line of incidence 345 that substantially tracks or parallels optical perspective 280. As a result, illumination device 340 may shine light such that it proceeds directly from camera 210 to illuminate the front portion of vehicle 270.

In other embodiments, both of illumination devices 330 and 340 may be positioned and oriented such that they illuminate subject vehicles (or the areas occupied by such vehicles) directly. For example, illumination device 330 could instead be positioned and oriented to shine light directly from camera 210 to vehicle 270, and illumination device 340 could be positioned and oriented to shine light directly from camera 210 to vehicle 250. Those skilled in the art will appreciate that multiple illumination devices may be configured in different ways in order to illuminate subjects simultaneously captured by camera 210 from different optical perspectives.

Figure 3C:
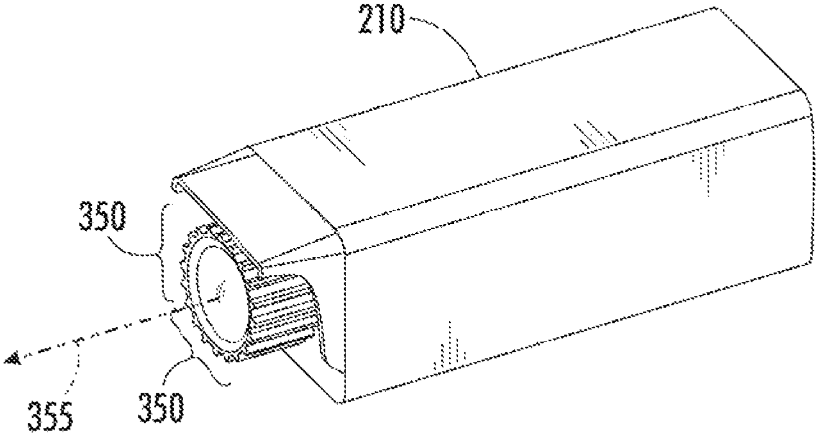
FIG. 3C is a diagram depicting an exemplary illumination configuration that may be used as part of a multiple-view transportation imaging system, consistent with certain disclosed embodiments.

In FIG. 3C, an alternate illumination configuration may be used in which two or more illumination devices 350 are positioned on or around camera 210 such that their respective illumination paths form a circle that is substantially coaxial with the optical path 355 of camera 210. For example, the illumination assembly of FIG. 3C could be used in the embodiment depicted in FIG. 2B, such that a first portion of the light shone from illumination devices 350 is reflected off of mirror 220 along optical perspective 240 to illuminate car 250, while a second portion shines directly along optical perspective 280 to illuminate car 270.

Thus, because illumination devices 350 form a perimeter around the field of view of camera 210, their incident light is similarly split between a reflected and direct path by the placement of a mirror 220 partially in the field of view of camera 210. Those skilled in the art will appreciate that the coaxial configuration of FIG. 3C is exemplary only, and that other configurations may be used to transmit light in such a manner that it is split between a reflected path and a direct path by virtue of following an optical path substantially similar to that of a camera whose field of view is also split. Moreover, in other embodiments, illumination devices need not be connected or attached to camera 210 in the manner depicted in FIG. 3B or FIG. 3C, but may instead be placed at different positions on supporting structure 215 or may be supported by a separate structure altogether.

Figure 4:
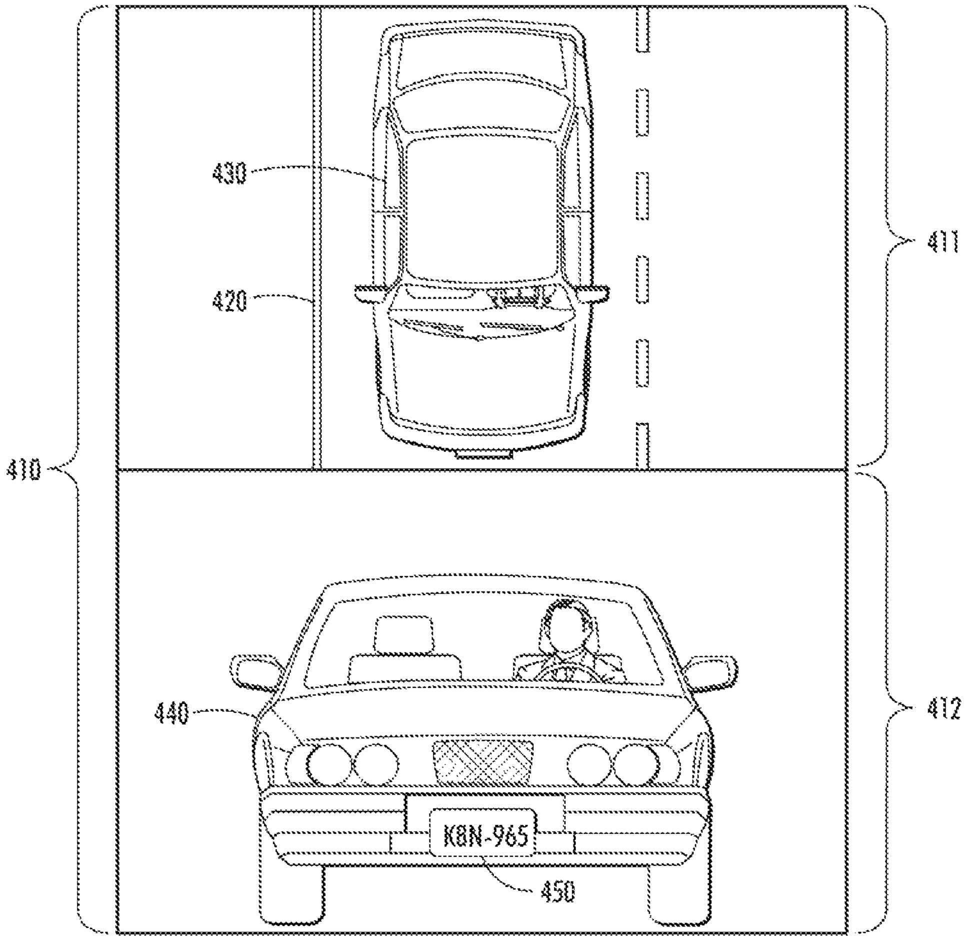
FIG. 4 is a diagram depicting an exemplary image that may be captured using a multiple-view transportation imaging system, consistent with certain disclosed embodiments.

FIG. 4 is a diagram depicting an exemplary image 410 that may be captured using a multiple-view transportation imaging system. Image 410 may comprise two regions: a top region 411 and a bottom region 412. Top region 411 may capture a view of the top portion of a vehicle 430 traveling on a road 420. Bottom region 412 may capture a view of the front portion of a vehicle 440, and a license plate 450 on vehicle 440 may be visible in the region.

In one embodiment, image 410 may represent an image that has been captured by camera 210 using a system similar to that depicted in FIG. 2A. In this embodiment, camera 210 may capture an image that embodies both a direct view of the front portion of a vehicle and a reflected view—e.g., via mirror 220A—of the top portion of the same vehicle. Hence, in this embodiment, the two vehicles photographed in image 410, vehicles 430 and 440, may be the same vehicle. As described above, for ease of reference, an image may represent either a single still-frame photograph or a series of consecutive or closely spaced photographs. Thus, for example, when analyzing speed, computing device 230 may need to analyze an image that comprises a series of consecutive photographs.

By analyzing image 410, computing device 230 may determine various vehicle characteristics. For example, computing device 230 may analyze top region 411, representing the top portion of the vehicle, to estimate vehicle speed, as described above. Additionally, computing device 230 may analyze bottom region 412, representing the front portion of the vehicle, to determine the text of license plate 450.

In another embodiment, image 410 may represent an image that has been captured by camera 210 using a system similar to that depicted in FIG. 2B. In this embodiment, camera 210 may capture an image that embodies both a direct view of the front portion of a first vehicle and a reflected view—e.g., via mirror 220—of the top portion of a second vehicle. Hence, in this embodiment, the two vehicles photographed in image 410, vehicle 430 and vehicle 440, may be different vehicles, similar to the different vehicles 270 and 250 depicted in FIG.

2B. Furthermore, similar to FIG. 2B, vehicle 440 may eventually move into the position formerly occupied by vehicle 430, and camera 210 may capture an image of the top portion of vehicle 440 from the reflected view.

As discussed above, the configurations of FIGS. 2A and 2B may also be modified such that the regions depicted in FIG. 4 may represent multiple, different views of one or more vehicles from multiple, different perspectives. For example, with respect to FIG. 2A, in an alternative configuration, top region 411 could display the top portion of a vehicle from a direct view, and bottom region 412 could display the front portion of the same vehicle from a reflected view. Or, top region 411 and bottom region 412 could display other portions of the same vehicle, such as the front and rear portions, respectively.

Similarly, with respect to FIG. 2B, in an alternative configuration, top region 411 could display the top portion of a first vehicle from a direct view, and bottom region 412 could display the front portion of a second vehicle from a reflected view. Or, top region 411 and bottom region 412 could display other portions of the two different vehicles, such as the front and side portions, or the front and rear portions, respectively. Moreover, because mirror 220 may be any shape, including hemispheric convex or other magnifying shape, in some embodiments, mirror 220 may provide camera 210 with a reflected view of multiple portions of a passing vehicle, such as both a top portion and a side portion.

In any event, image 410 may represent a single photograph taken by camera 210 such that a first portion of the camera's field of view included a direct view and a second portion included a reflected view. And, as a result of the split field of view, camera 210 was able to capture two different perspectives of a single vehicle (or two different vehicles at different locations) within a single snapshot or video frame. Camera 210 may also capture a plurality of sequential images similar to image 410 for the purpose of analyzing vehicle characteristics such as speed, as further described below.

Furthermore, although a multiple view imaging system may be configured such that region 411 comprises the top half of the image 410 and region 412 comprises the bottom half of image 410, other system configurations may be used such that image 410 may be arranged differently. For example, the system may be configured such that image 410 may comprise more than two regions, and a plurality of regions may represent multiple views provided to a camera through the use of a plurality of mirrors.

Additionally, image 410 may include regions that comprise more than half or less than half of the complete image. Those skilled in the art will appreciate that image 410, including its regions and their mapping to particular views, perspectives, or vehicles, may be arranged differently depending on the configuration of the imaging system as a whole. For example, in some embodiments, region 411 and/or region 412 may be arranged as different shapes within image 410, such as a quadrilateral, an ellipse, a hexagonal cell, etc.

Moreover, although exemplary image 410 may capture a view of a vehicle in both region 411 and region 412, photographs taken by camera 210 may display a vehicle in only one region or may not display a vehicle in any region. Consequently, it may be advantageous to determine whether camera 210 has captured a vehicle within a region before analysis is performed on the image. Therefore, a vehicle detection process may be used to first detect whether a vehicle is present within a region.

Figure 5:
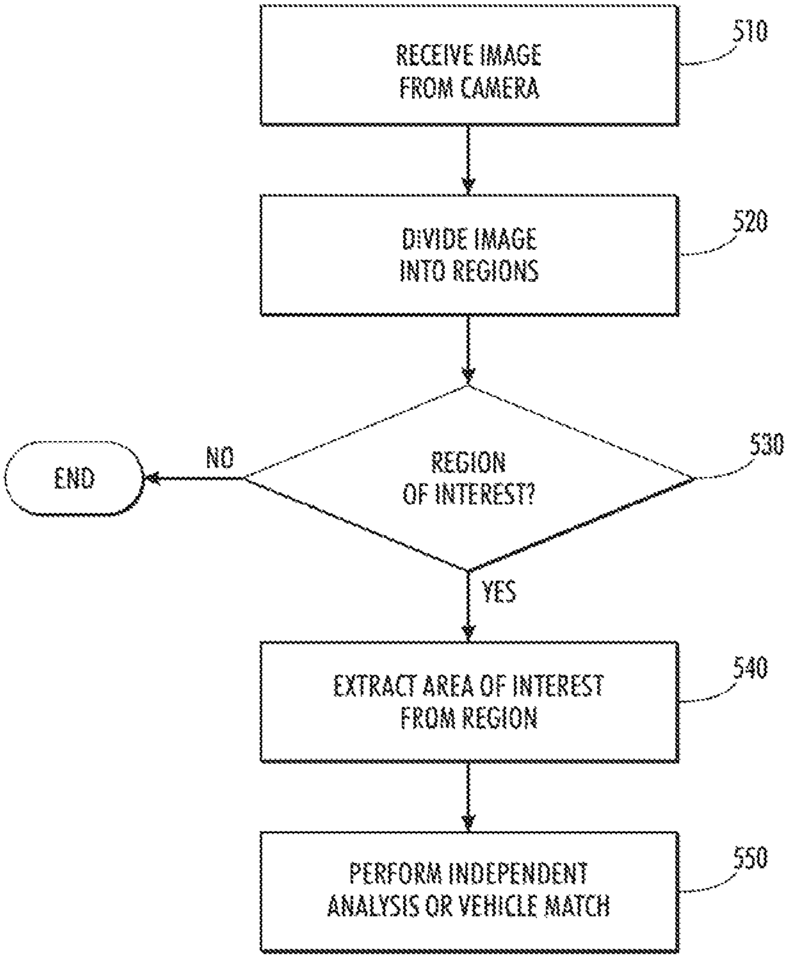
FIG. 5 is a flow diagram illustrating an exemplary method of performing a region analysis, consistent with certain disclosed embodiments.

FIG. 5 is a flow diagram illustrating an exemplary method of performing a region analysis that may be used in a multiple-view transportation imaging system, consistent with certain disclosed embodiments. The process may begin in step 510, when a computing device, such as computing device 230, receives an image captured by a camera, such as camera 210. The image may contain a direct view region and one or more reflected view regions. For example, the image may include a top region representing a reflected view of the top portion of a vehicle and bottom region representing a direct view of the front portion of a vehicle, similar to image 410.

In step 520, computing device 230 may divide the image into its respective regions. The image may be separated using a variety of techniques including, but not limited to, separating the image according to predetermined coordinate boundaries using known distances between the camera and mirrors (s). For example, image 410 may be split into a top region and a bottom region using a known pixel location where the direct view should terminate and the reflected view should begin according to the system configuration. As used herein, the term "divide" may also refer to simply distinguishing between the respective regions of an image in processing logic rather than actually modifying image 410 or creating new sub-images in memory.

In step 530, computing device 230 may determine whether a vehicle is present within a region. In one embodiment, step 530 may be performed using motion detection software. Motion detection software may analyze a region to detect whether an object in motion is present. If an object in motion is detected within the region, then it may be determined that a vehicle is present within the region. In another embodiment, step 530 may be performed through the use of a reference image. In this embodiment, the region may be compared to a reference image that was previously captured by the same camera in the same position when no vehicles were present and, thus, contains only background objects. If the region contains an object that is not in the reference image, then it may be determined that a vehicle is present within the region.

In some embodiments, if a vehicle is not present within a region, then that region may be discarded or otherwise flagged to be excluded from further analysis. If a vehicle is present within the region, then the region may be flagged as a region of interest.

Individual images or regions may be stored as digital image files using various digital images formats, including Joint Photographic Experts Group (JPEG), Graphics Interchange Format (GIF), Windows bitmap (BMP), or any other suitable digital image file format. Stored images or regions may be stored as individual files or may be correlated with other individual files that are part of the same image or region. Sequences of photographs or regions may be stored using various digital video formats, including Audio Video Interleave (AVI), Windows Media Video (WMV), Flash Video, or any other suitable video file format. In other embodiments, visual or image data may not be stored as files or as other persistent data structures, but may instead be analyzed entirely in real-time and within volatile memory.

After a region of interest has been determined, analysis may be performed on the region of interest. In some cases, a region of interest, in addition to including a vehicle, may also include background objects that are not necessary for determining vehicle characteristics. Background objects may include, but are not limited to, roads, road markings, other vehicles, portions of the vehicle that are not needed for analysis, and/or background scenery. Accordingly, areas of interest may be extracted or distinguished from a region of interest by cropping out background objects that are not necessary for calculating vehicle characteristics.

In step 540, computing device 230 may extract one or more areas of interest from the region of interest. For example, when attempting to ascertain the text of a license plate, the area of interest may comprise the expected location of a license plate on the front or rear portion of a vehicle. Alternatively, when attempting to determine vehicle speed, the front or top portion of a vehicle may be an area of interest. Additionally, when attempting to determine vehicle occupancy, the area of interest may focus on views of passengers within a vehicle. Furthermore, if more than one vehicle is captured in a single region, then multiple areas of interest may be extracted from the region with each area of interest representing a separate vehicle.

In step 550, regions of interest or areas of interest may either be analyzed independently, as described below for FIGS. 6A, 6C, and 7, and/or matched to other regions or areas of interest containing the same vehicle to perform a combined analysis, as described below for FIGS. 6B, 6C, and 7.

Although the embodiment depicted with respect to FIG. 5 is described in terms of areas of interest, the use of areas of interest is exemplary only, and an analysis of the entire region or the entire image may be considered embodiments of the present disclosure. Accordingly, use of the term "region of interest" below may refer to an area of interest or an image, depending on the embodiment. Additionally, areas of interest may be extracted, if at all, before or after splitting the image into multiple regions, and may be extracted from regions that are not regions of interest, and/or may be extracted before or after regions of interest are selected.

Additionally, computing device 230 may perform various image manipulation operations on the captured images, regions, or areas. Image manipulation operations may be performed before or after images are split, before or after regions of interest are selected, before or after analyses are performed on the image, or may not be performed at all. In some embodiments, image manipulation operations may include, but are not limited to, image calibration, image preprocessing, and image enhancement.

A person having skill in the art would recognize that the list and sequence of the region analysis steps mentioned above are merely exemplary, and any sequence of the above described steps or any additional region analysis steps that are consistent with certain disclosed embodiments may be used.

Figure 6A:
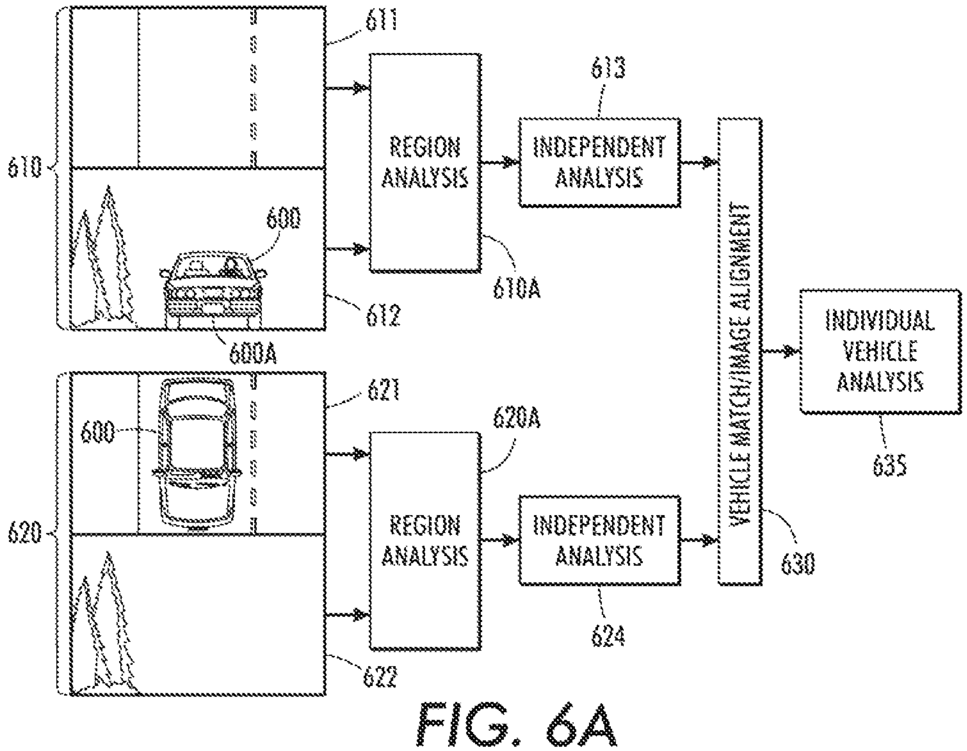
FIG. 6A is a flow diagram illustrating an exemplary method of determining vehicle characteristics using a view independent analysis, consistent with certain disclosed embodiments.

FIG. 6A is a flow diagram illustrating an exemplary method of determining vehicle characteristics using a view independent analysis, consistent with certain disclosed embodiments. A view-independent analysis may be performed using one or more regions of interest by first analyzing each region of interest independently. Data from the independent analysis of a region of interest may then be combined with data from other independent analyses of regions of interest displaying the same vehicle. For example, a first region of interest displaying the front of a vehicle from a lateral perspective may be analyzed to determine license plate information, and a second region of interest displaying the top of the same vehicle from a top-down perspective may be analyzed to estimate vehicle speed. The license plate information and speed estimation may be combined and stored as vehicle characteristics for the vehicle.

As depicted in FIG. 6A, images 610 and 620 may represent images captured by camera 210 using a system similar to the embodiment depicted in FIG. 2B. Images 610 and 620 may represent two images captured by the same camera in the same position at different times. A top region 611 of image 610 may display an empty roadway from a top-down perspective. A bottom region 612 of image 610 may display the front portion of a vehicle 600 from a lateral perspective, and a license plate 600A may be visible and attached to the front portion of vehicle 600.

A top region 621 of image 620 may display the top portion of vehicle 600 from a top-down perspective. In this example, vehicle 600 in top region 621 and vehicle 600 in bottom region 612 may be the same vehicle. In particular, image 610 may represent a photograph taken by camera 210 at a first time, when vehicle 600 is within a first view of camera 210, and image 620 may represent a photograph taken by camera 210 at a second, subsequent time, when vehicle 600 has moved into a second view of camera 210. In some embodiments, the first view may be a direct view and the second view may be a reflected view, or vice-versa.

In steps 610A and 620A, computing device 230 may extract top regions 611 and 621 of images 610 and 620 from bottom regions 612 and 622 of images 610 and 620. Computing device 230 may thereafter perform analysis on each extracted region, as described above. As depicted in FIG. 6A, no vehicle may be present within regions 611 and 622, and vehicle 600 may be present within regions 612 and 621. Accordingly, computing device 230 may determine that regions 611 and 622 are not regions of interest and that regions 612 and 621 are regions of interest. In some embodiments, computing device 230 may also extract areas of interest from regions of interest 612 and 621.

In step 613, computing device 230 may perform an analysis of region of interest 612 independent of other regions of interest. Additionally, in step 624, computing device 230 may perform an analysis of region of interest 621 independent of other regions of interest. For example, bottom region 612, which may represent the front portion of vehicle 600, may be analyzed to determine the text on license plate 600A. Additionally, top region 621, which may represent the top portion of vehicle 600, may be analyzed to determine the speed of vehicle 600.

In step 630, computing device 230 may perform a vehicle match process on regions 612 and 621 to determine that vehicle views 600 correspond to the same vehicle. The vehicle match process may be performed using a variety of techniques including, but not limited to, utilizing knowledge of approximate time-location delays or matching vehicle characteristics, such as vehicle color, vehicle width, vehicle type, vehicle make, vehicle model, or the size and shape of various vehicle features. In some embodiments, after a vehicle match is made, region 612 may be aligned with region 621 to create a single aligned image that displays the vehicle from multiple perspectives.

In step 635, the aligned image and data from steps 613 and 624 may be stored as individual vehicle analytics for vehicle 600. Individual vehicle characteristics for each vehicle may be stored in the memory of computing device 230 or may be transmitted to a remote location for storage or further analysis. Individual vehicle characteristics data may be stored using the license plate number of each vehicle detected as an index or reference point for the data. Alternatively, the data may be stored using other vehicle characteristics or using data as index references or keys, or the data may be stored in association with image capture times and/or camera locations. Those skilled in the art will appreciate, that the foregoing approaches for storing data are exemplary only.

Figure 6B:
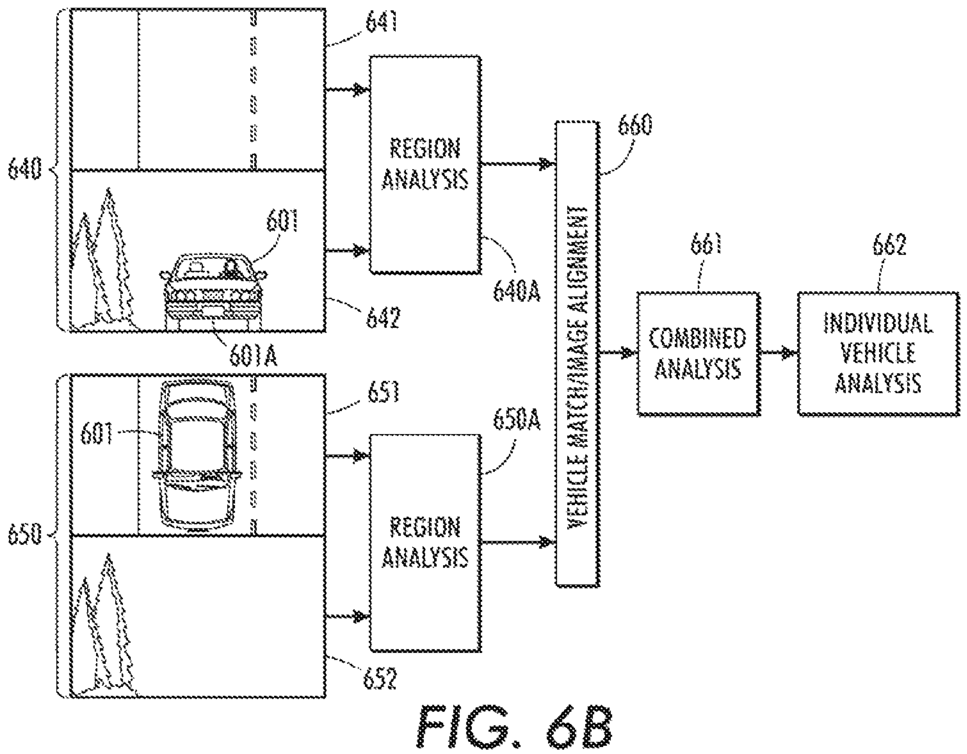
FIG. 6B is a flow diagram illustrating an exemplary method of determining vehicle characteristics using a view-to-view dependent analysis, consistent with certain disclosed embodiments.

FIG. 6B is a flow diagram illustrating an exemplary method of determining vehicle characteristics using a view-to-view dependent analysis, consistent with certain disclosed embodiments. A view-to-view dependent analysis may be performed using a plurality of regions of interest by first matching regions of interest displaying the same vehicle and using the data from the matched regions to determine vehicle characteristics. For example, a first region of interest displaying the front of a vehicle from a lateral perspective may be matched to a second region of interest displaying the top of the same vehicle from a top-down perspective. The position of the vehicle in the first region of interest may be compared to the position of the vehicle in the second region of interest to estimate the speed of the vehicle as it traveled between the two positions.

Another example of using a view-to-view dependent analysis is the determination of the vehicle's make, model or type, which may benefit from the analysis of two different views of the same vehicle.

As depicted in FIG. 6B, images 640 and 650 may represent images captured by camera 210 using a system similar to the embodiment depicted in FIG. 2B. Images 640 and 650 may represent two images captured by the same camera in the same position at different times. In particular, images 640 and 650, as well as regions 641, 642, 651, and 652 may be arranged in a manner similar to those depicted in FIG. 6A. Moreover, in steps 640A and 650A, computing device 230 may extract individual regions and identify regions of interest and/or areas of interest in a manner similar to that described with respect to FIG. 6A.

In step 660, computing device 230 may perform a vehicle match on regions 642 and 651 and may determine that the vehicles 601 captured in both views represent the same vehicle. The vehicle match process may be performed using a variety of techniques, such as those described above. In some embodiments, after a vehicle match is made, region 642 may be aligned with region 651 to create a single aligned image that displays vehicle 601 from multiple perspectives.

In step 661, computing device 230 may analyze the aligned image created in step 660. For example, the aligned image may be used to determine vehicle speed by comparing the time and location of vehicle 601 in bottom region 642 to the time and location of vehicle 601 in top region 651. The system depicted in FIG. 2B may allow for a larger distance between the first direct view data point and the second reflected view data point than could be obtained through a single view. The larger distance between data points may increase the accuracy of speed estimation compared to a single view image because location estimation errors may have less of an adverse effect on speed estimates as the distance between data points increases. Accordingly, speed estimation obtained using a view-to-view dependent analysis of multiple regions may be more accurate than a speed estimation obtained through a single region or through an independent analysis.

In other embodiments, the aligned image may be used to determine a more accurate occupancy count. For example, a front perspective region may be combined with a side perspective region to more accurately determine the number of occupants in a vehicle.

In step 662, the aligned image and data from step 661 may be stored as individual vehicle characteristics for vehicle 601. Individual vehicle characteristics data for each vehicle may be stored in the memory of computing device 230 or may be transmitted to a remote location for storage or further analysis using techniques such as those described with respect to FIG. 6A.

Figure 6C:
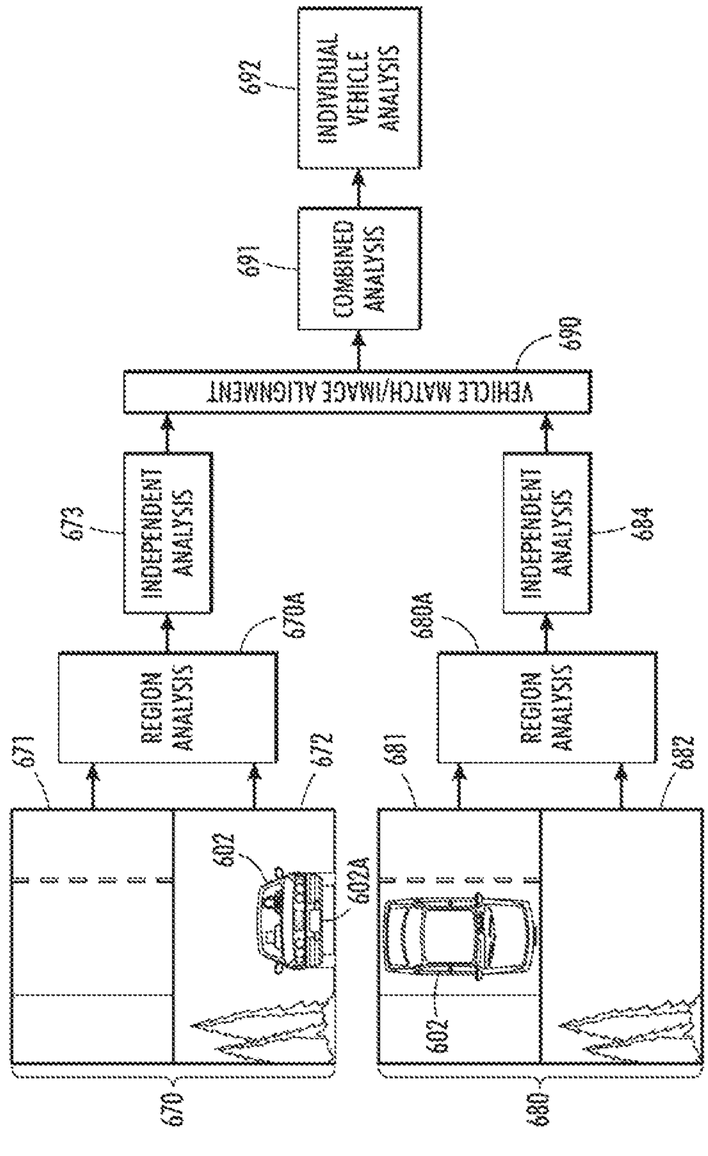
FIG. 6C is a flow diagram illustrating an exemplary method of determining vehicle characteristics using a combined view independent analysis and view-to-view dependent analysis, consistent with certain disclosed embodiments.

FIG. 6C is a flow diagram illustrating an exemplary method of determining vehicle characteristics using a combined view independent analysis and view-to-view dependent analysis, consistent with certain disclosed embodiments. A combined view independent analysis and view-to-view dependent analysis may be performed using a plurality of regions of interest by first analyzing each region independently, then matching regions of interest containing the same vehicle to perform a view-to-view dependent analysis. Ultimately, data from independent and dependent analyses of the same vehicle may be combined and stored as vehicle characteristics for the vehicle. For example, a first region of interest displaying the front of a vehicle from a lateral perspective may be analyzed to determine a first estimated vehicle speed, and a second region of interest displaying the top of the same vehicle from a top-down perspective may be analyzed to determine a second estimated vehicle speed. Then, the first region of interest may be matched to the second region of interest, and the position of the vehicle in the first region of interest may be compared to the position of the vehicle in the second region of interest to determine a third estimated vehicle speed. Ultimately, a potentially more accurate speed estimate may be obtained by comparing and/or (weighted) averaging the three separately estimated speeds of the vehicle.

As depicted in FIG. 6C, images 670 and 680 may represent images captured by camera 210 using a system similar to the embodiment depicted in FIG. 2B. Images 670 and 680 may represent two images captured by the same camera in the same position at different times. In particular, images 670 and 680, as well as regions 671, 672, 681, and 682 may be arranged in a manner similar to those depicted in FIG. 6A. Moreover, in steps 670A and 680A, computing device 230 may extract, individual regions and identify regions of interest and/or areas of interest in a manner similar to that described with respect to FIG. 6A.

In steps 673 and 684, computing device 230 may perform independent analyses of regions of interest 672 and 681 in a manner similar to the regions of interest depicted in FIG. 6A. For example, bottom region 672, which may represent the front portion of vehicle 602, may be analyzed to estimate the speed of vehicle 602 and the text of license plate 602A. Additionally, top region 681, which may represent the top portion of vehicle 602, may also be analyzed to estimate the speed of vehicle 602.

In step 690, computing device 230 may perform a vehicle match on regions 672 and 681 and may determine that the vehicles 602 captured in both views represent the same vehicle. The vehicle match process may be performed using a variety of techniques, such as those described above. In some embodiments, after a vehicle match is successful, region 672 may be aligned with region 681 to create a single aligned image that displays the vehicle from multiple perspectives.

In step 691, computing device 230 may analyze the aligned image and may additionally use data from the independent analyses of steps 773 and 684. For example, in some embodiments, computing device 230 may combine—e.g., in a weighted manner—speed estimates made during independent analyses 673 and 684 with a speed estimate made using the aligned image. Accordingly, by combining the results of view independent and view-to-view dependent analyses, the combined speed estimate produced using a combined view independent and view-to-view dependent analysis of multiple regions may be more accurate than a speed estimate obtained through a single region, through a view independent analysis, or through a view-to-view dependent analysis.

In another embodiment, computing device 230 may determine occupancy using data from independent analyses 673 and 684 by combining the results to compute a total number of occupants. In an additional embodiment, the text of license plate 602A may be captured and analyzed during independent analyses 673 and 684. Results from the independent license plate analyses may be combined by comparing overall confidences of each character in each view to achieve a more accurate license plate reading.

In step 692, the aligned image and data from steps 673, 684, and 691 may be stored as individual vehicle characteristics for vehicle 602. Individual vehicle characteristics data for each vehicle may be stored in the memory of computing device 230 or may be transmitted to a remote location for storage or further analysis using techniques such as those described with respect to FIG. 6A.

FIGS. 6A-6C illustrate the use of exemplary view independent analysis, view-to-view dependent analysis, and combined view independent analysis and view-to-view dependent analysis techniques, respectively, to determine vehicle characteristics using a camera and mirror system similar to the system depicted in FIG. 2B. Vehicle characteristics may also be determined using a camera and mirror system similar to the system depicted in FIG. 2A. Moreover, since such an embodiment may allow the simultaneous display of multiple portions of a vehicle from multiple perspectives, vehicle match/image alignment steps may be simplified or omitted.

Figure 7:
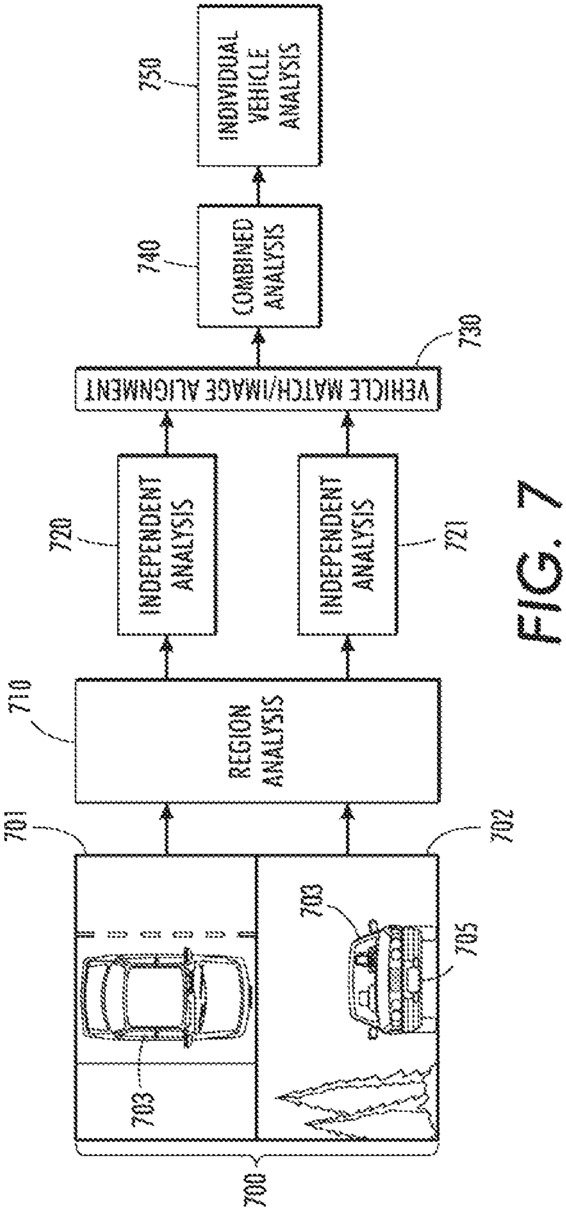
FIG. 7 is a flow diagram illustrating an exemplary method of determining vehicle characteristics using a combined view independent analysis and view-to-view dependent analysis, consistent with certain disclosed embodiments.

For example, FIG. 7 is a flow diagram illustrating an exemplary method of determining vehicle characteristics using a combined view independent analysis and view-to-view dependent analysis, consistent with certain disclosed embodiments. As depicted in FIG. 7, image 700 may represent an image captured by camera 210 using a system similar to the embodiment depicted in FIG. 2A. Due to the position of camera 210 and mirror 220A in FIG. 2A, a vehicle 703 may be captured by camera 210 in both the top and bottom regions of image 700 simultaneously. Accordingly, a top region 701 may represent the top portion of vehicle 703 from a top-down perspective, and a bottom region 702 may represent the front portion of vehicle 703 from a lateral perspective. Additionally, a license plate 705 may be visible and attached to the front portion of vehicle 703.

In step 710, computing device 230 may distinguish top region 701 from bottom region 702 using techniques such as those described above. During a region analysis, computing device 230 may determine that a vehicle is present within both regions 701 and 702 and, accordingly, may determine that both regions 701 and 702 are regions of interest. In some embodiments, computing device 230 may additionally extract areas of interest from regions of interest 701 and 702.

In steps 720 and 721, computing device 230 may perform independent analyses of regions of interest 701 and 702 in a manner similar to the regions of interest depicted in FIG. 6A. Steps 720 and 721 may be used to compute various vehicle characteristics, including, but not limited to, vehicle speed, license plate identification, and occupancy detection, as described above.

In step 730, computing device 230 may perform a vehicle match on regions 701 and 702 and may determine that the vehicles 703 captured in both views represent the same vehicle. In this embodiment, a vehicle match may not be necessary because there may be no time delay between when a vehicle is displayed in the reflected view and the direct view. If necessary, however, the alignment step 730 may be performed as described above. In step 740, the potentially prealigned image may then be used, along with the data computed in steps 720 and 721, as part of a combined analysis of vehicle 703, as described above.

In step 750, the aligned image and data from steps 720, 721, and 740 may be stored as individual vehicle characteristics for vehicle 703. Individual vehicle characteristics data for each vehicle may be stored in the memory of computing device 230 or may be transmitted to a remote location for storage or further analysis using techniques such as those described with respect to FIG. 6A.

The camera/mirror configuration depicted in FIG. 2A may also be used in conjunction with a view independent model or a view-to-view dependent model. Thus, the techniques described with respect to FIGS. 6A and 6B may easily be adapted to analyze vehicle characteristics for the system configuration depicted in FIG. 2A. Thus, for example, with respect to FIG. 6A, both top region 611 and bottom region 612 of image 610 could simultaneously display a portion of the same vehicle from different perspectives (e.g., using different views). At the same time, the regions of image 620 could also display two different perspectives of the same vehicle (albeit a different vehicle from that displayed in image 610) from different perspectives, or neither region could contain a vehicle. Similar modification could be made for the techniques described with respect to FIG. 6B.

Moreover, while the embodiments described above may utilize a reflective surface, such as a mirror, to provide a camera with a view other than a direct view, the present disclosure is not limited to the use of only direct and reflected views. Other embodiments may utilize other light bending objects and/or techniques to provide a camera with non-direct views that include, but are not limited to, refracted views.

Furthermore, the foregoing description has focused on the use of a static mirror to illustrate exemplary techniques for providing a camera with simultaneous views from multiple, different perspectives and for analyzing the image data captured thereby. However, the present disclosure is not limited to the use of static mirrors. In other embodiments, one or more non-static mirrors may be used to provide a camera with multiple, different views.

Figure 8A:
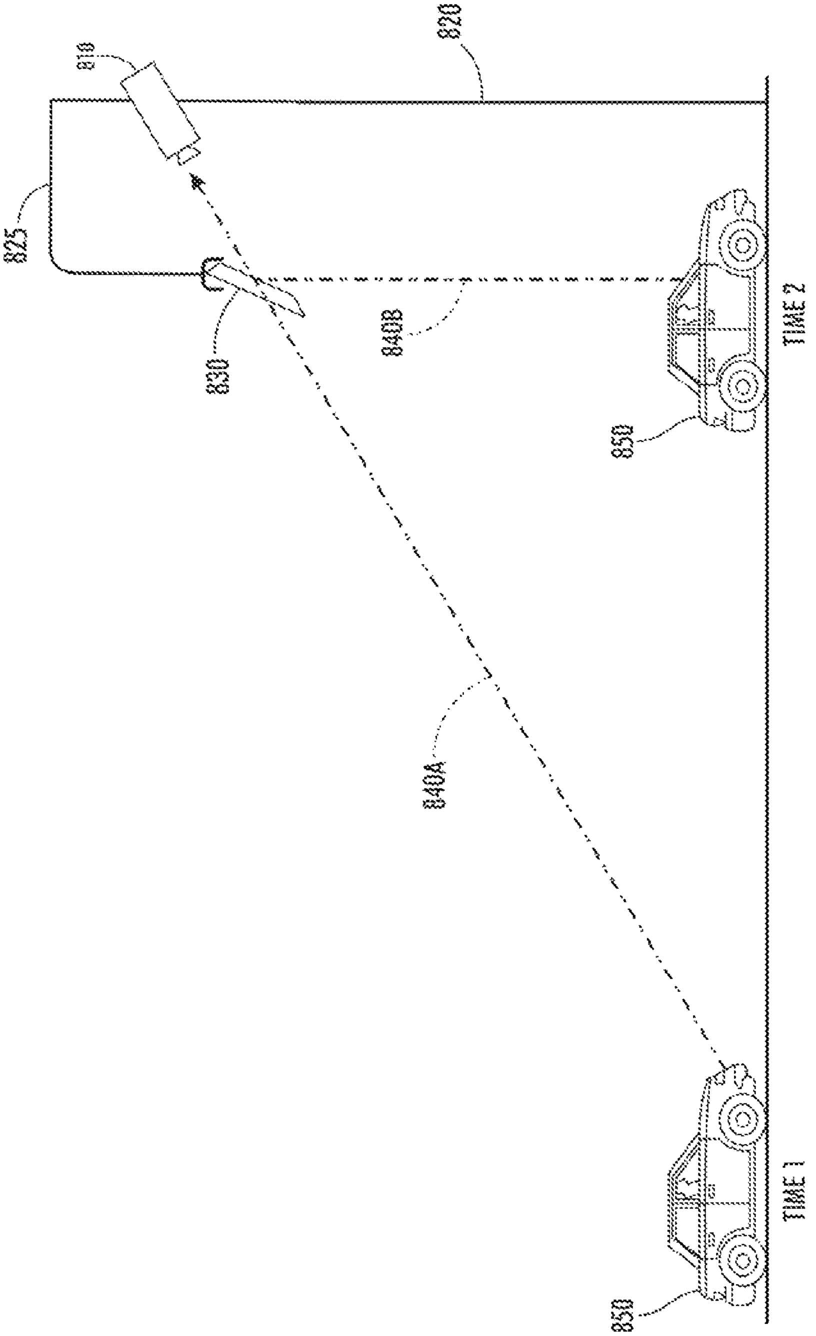
FIG. 8A is a diagram depicting an exemplary multiple-view transportation imaging system using a single-camera architecture and a non-static mirror, consistent with certain disclosed embodiments.

FIG. 8A is a diagram depicting an exemplary multiple-view transportation imaging system using a single-camera architecture and a non-static mirror, consistent with certain disclosed embodiments. As depicted in FIG. 8A, a single camera 810 may be mounted on a supporting structure 820, such as a pole. Supporting structure 820 may also include an arm 825, or other structure, that supports a non-static mirror 830.

In some embodiments, non-static mirror 830 may be a reflective surface that is capable of alternating between reflective and transparent states. Various techniques may be used to cause non-static mirror 830 to alternate between reflective and transparent states, such as exposure to hydrogen gas or application of an electric field, both of which are well-known in the art. See U.S. Patent Publication No. 2010/0039692, U.S. Pat. No. 6,762,871, and U.S. Pat. No. 7,646,526, the contents of which are hereby incorporated by reference.

One example of an electrically switchable transreflective mirror is the KentOptronics e-TransFlector™ mirror, which is a solid-state thin film device made from a special liquid crystal material that can be rapidly switched between pure reflection, half reflection, and total transparent states. Moreover, the e-TransFlector™ reflection bandwidth can be tailored from 50 to 1,000 nanometers, and its state-to-state transition time can range from 10 to 100 milliseconds. The e-TransFlector™ can also be customized to work in a wavelength band spanning from visible to near infrared, which makes it suitable for automated traffic monitoring applications, such as automatic license plate recognition (ALPR). The e-TransFlector™, or other switchable transreflective mirror, may also be convex or concave in nature in order to provide specific fields of view that may be beneficial for practicing the disclosed embodiments.

As depicted in FIG. 8A, camera 810 may be provided with different views 840 depending on the reflective state of non-static mirror 830. For example, at a first time, non-static mirror 830 may be set to a transparent (or substantially transparent) state. As a result, camera 810 may have a direct view 840*a* of the front portion of a vehicle 850 from a lateral perspective. That is, light waves originating or reflecting from vehicle 850 may travel to camera 810 along a substantially linear path that is neither substantially obscured nor substantially refracted by non-static mirror 830 due to its transparent state.

At a second, later time, non-static mirror 830 may be set to a reflective (or substantially reflective) state. As a result, camera 810 may have a reflected view 840*b* of the top portion of vehicle 850 from a top-down perspective. That is, light waves originating or reflecting from vehicle 850 may travel to camera 810 by first reflecting off of non-static mirror 830 due to its reflective state.

In other embodiments, rather than changing from reflective to transparent states, non-static mirror 830 could provide camera 810 with different views by changing position instead. For example, non-static mirror 830 could remain reflective at all times. However, at a first time, arm 825 could move non-static mirror 830 out of the field of view of camera 810, such that camera 810 is provided with an unobstructed, direct view 840*a* of vehicle 850. Then, at a second, later time, arm 825 could move non-static mirror 830 back into the field of view of camera 810, such that camera 810 is provided with a reflected view 840*b* of vehicle 850.

In other embodiments, mirror 830 could remain stationary, and camera 810 could instead change its position or orientation so as to alternate between one or more direct views and one or more reflective views. In still other embodiments, camera 810 could make use of two or more mirrors 830, any of which could be stationary, movable, or transreflective. In further embodiments, non-static mirror 830 may only partially cover camera 810's field of view, such camera 810 is alternately provided with a completely direct view and a view that is part reflected and part direct, as in FIGS. 2A and 2B.

Those skilled in the art will appreciate that the configuration for a non-static mirror depicted in FIG. 8A is exemplary only. For example, in some embodiments, non-static mirror 830 may be mounted on a structure other than structure 820, which supports camera 810. In another configuration, non-static mirror 830 could be positioned in manner similar to that of FIG. 2A, such that camera 810 may be provided with a direct view or a reflected view of different portions of the same vehicle depending on the state of the non-static mirror, whether positional or reflective.

Figure 8B:
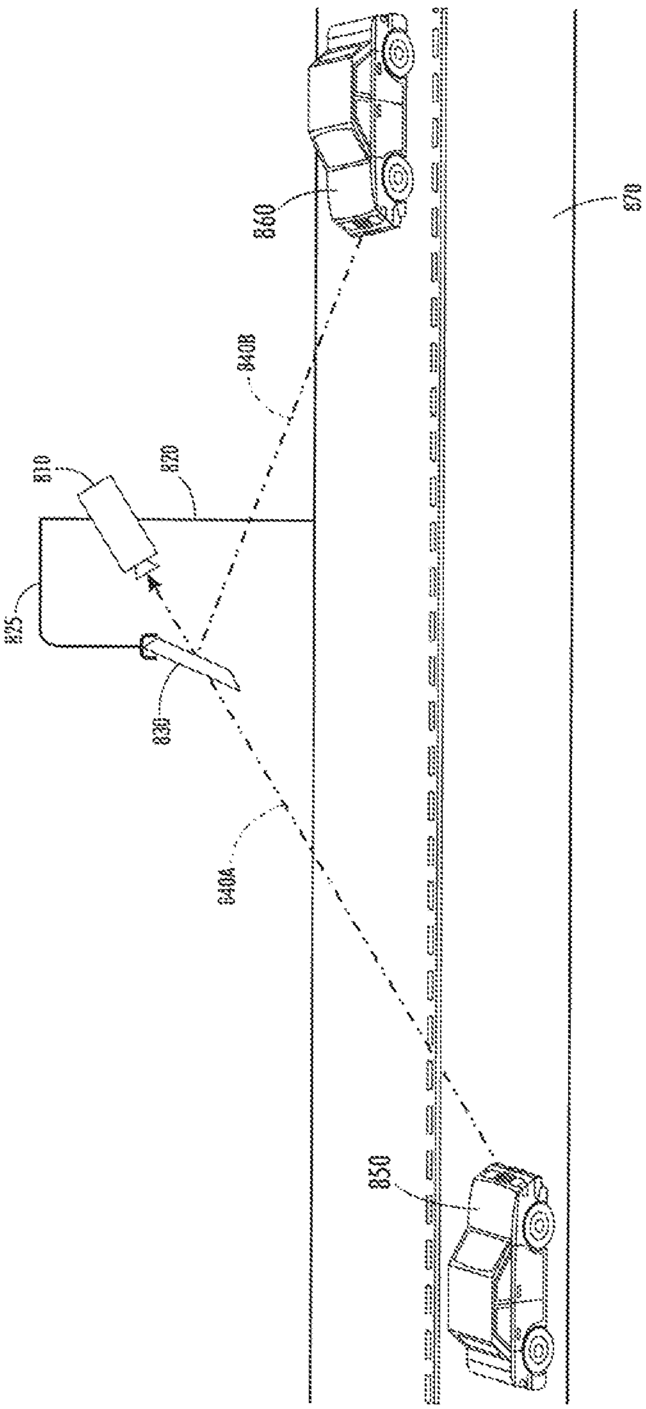
FIG. 8B is a diagram depicting an exemplary multiple-view transportation imaging system using a single-camera architecture and a non-static mirror, consistent with certain disclosed embodiments.

Similar to the embodiments described with respect to FIGS. 2A and 2B, non-static mirror 830 may be used to provide camera 810 with different views of any combination of portions of the same vehicle or different vehicles from any perspectives. For example, as depicted in FIG. 8B, the configuration of FIG. 8A may be modified such that when non-static mirror 830 is either set to a transparent state or moved out of view, camera 810 is provided with a direct view 840*a* of a first vehicle 850 traveling along road 870 in a first direction. However, when non-static mirror 830 is either set to a reflective state or moved into view, camera 810 is provided with a reflected view 840*b* of a second, different vehicle 860 traveling along road 870 in a second, different direction.

Various different techniques may be used for determining when to switch a non-static mirror from one reflective/transparent state or position to a different state in order to ensure that images are captured of a vehicle from two different perspectives. In one embodiment that may be referred to as "vehicle triggering," switching may adapt to traffic flow by triggering off of the detection of a vehicle in a first view. For example, with reference to FIG. 8A, non-static mirror may be set initially (or by default) to a transparent state. Upon detecting vehicle 850 at Time 1, camera 810 may capture an image (which may comprise one or more still-frame photographs) of vehicle 850 using direct view 840*a*. Vehicle 850's speed may also be calculated using the captured image, and the necessary switching time for non-static mirror 830 may be estimated based on that speed. In other words, it may be estimated how quickly, or at what time, non-static mirror 830 should switch to a reflective state in order to capture an image of vehicle 850 at Time 2 using reflected view 840*b*.

In another embodiment that may be referred to as "periodic triggering," non-static mirror 830 may alternate between states according to a regular time interval. For example, non-static mirror 830 could be set to a transparent state for five video frames in order to capture frontal images of any vehicles that are within direct view 840*a* during that time. Energy could then be supplied to non-static mirror 830 in order to change it to a reflective state. Depending on the type of transreflective mirror that is used, it may take up to two video frames before non-static mirror 830 is switched to a reflective state, after which non-static mirror 830 may capture three video frames of any vehicles that are within reflected view 840*b* during that time. Again, depending on the type of transreflective mirror that is used, it may then take up to five video frames before non-static mirror 830 is sufficiently discharged back to a transparent state.

The timeframes in which non-static mirror 830 is switching from one state to a different state may be considered blind times, since, in some cases, sufficiently satisfactory images of vehicles may not be captured during these timeframes. Thus, in some embodiments, depending on how many frames are captured per second and how fast vehicles are traveling, it may be possible for a vehicle to pass through either direct view 840*a* or reflected view 840*b* before camera 810 is able to capture a sufficiently high-quality image of the vehicle. Therefore, in some embodiments, the frame-rate or the number of frames taken during each state of non-static mirror 830 may be modified, either in real-time or after analysis, to ensure that camera 810 is able to capture images of all vehicles passing through both direct view 840*a* and reflected view 840*b*. Similarly considerations and modifications may also be used in the case of a movable mirror 830 or a movable camera 810.

In any of the above non-static mirror configurations, or variations on the same, the image data captured could be analyzed using techniques similar to those described above with respect to FIGS. 5-7. For example, using a view independent analysis, as described with respect to FIG. 6A, a first image may be captured of vehicle 850 at Time 1 from a lateral perspective using direct view 840*a*. That first image may be analyzed to determine vehicle 850's license plate information or other vehicle characteristics. Later, at Time 2, a second image may be captured of vehicle 850 from a vertical perspective using reflected view 840*b*, and the second image may be used to determine the vehicle's speed. Various techniques may be used to determine that the vehicle in the first image matches that of the second image, and a record may be created that maps vehicle 850's license plate number to its detected speed.

Alternatively or additionally, using a view-to-view dependent analysis, as described with respect to FIG. 6B, vehicle 850's speed may be calculated by comparing its position in the first image (from direct view 840*a*) to its position in the second image (from reflected view 840*b*). Or, using a combined view independent analysis and view-to-view dependent analysis, any one or more vehicle characteristics (e.g., speed, license plate information, passenger configuration, etc.) may be determined independently from both the first image and the second image. Those independent determinations may then be combined and/or weighted to arrive at a synthesized estimation that may be more accurate due to inputs from different perspectives, each of which may have different strengths or weaknesses (e.g., susceptibility to geometric distortion, feature tracking, occlusion, lighting, etc.).

Those skilled in the art will appreciate the various ways in which the techniques described with respect to FIGS. 5-7 may need to be modified to account for images that are not divided into separate regions as they might be for the embodiments of FIGS. 2A and 2B.

In other embodiments, the steps described above for any figure may be used or modified to monitor passing traffic from multiple directions. Additionally, in another embodiment, the steps described above may be used by parking lot cameras to monitor relevant statistics that include, but are not limited to, parking lot occupancy levels, vehicle traffic, and criminal activity.

The perspectives depicted in the figures and described in the specification are also not to be interpreted as limiting. Those of skill in the art will appreciate that different embodiments of the invention may include perspectives from any angles that enable a computing device to determine a feature or perform any calculation on a vehicle or other monitored object.

The foregoing description of the present disclosure, along with its associated embodiments, has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments. The steps described need not be performed in the same sequence discussed or with the same degree of separation. Likewise, various steps may be omitted, repeated, or combined, as necessary, to achieve the same or similar objectives or enhancements. Accordingly, the present disclosure is not limited to the above-described embodiments, but instead is defined by the appended claims in light of their full scope of equivalents.

In the claims, unless specified otherwise, the term “image” is not limited to any particular image file format, but rather may refer to any kind of captured, calculated, or stored data, whether analog or digital, that is capable of representing graphical information, such as real-world objects. An image may refer to either an entire frame or frame sequence captured by a camera, or sub-frame area such as a particular region or portion area. Such data may be captured, calculated, or stored in any manner, including raw pixel arrays, and need not be stored in persistent memory, but may be operated on entirely in real-time and in volatile memory. Also, as discussed above, in the below claims, the term “image” may refer to a defined sequence or sampling of multiple still-frame photographs, and may include video data. Further, in the claims, unless specified otherwise, the terms “first” and “second” are not to be interpreted as having any particular temporal order, and may even refer to the same object, operation, or concept.

What is claimed is:

1. A method of monitoring traffic using a single camera device, the method comprising:

capturing a first image of a vehicle using the camera device, wherein the first image displays the vehicle from a first optical perspective comprising one of a vertical perspective and a lateral perspective;

capturing a second image of the vehicle using the camera device, wherein the second image displays the vehicle from a second optical perspective, wherein:

the second optical perspective comprises a different one of the vertical perspective and the lateral perspective of the vehicle than the first optical perspective; and the second optical perspective is obtained via reflection off of a surface external to the camera device; and determining characteristics of the vehicle by analyzing the first image and the second image.

2. The method of claim 1, wherein the first optical perspective is obtained via a direct view of the vehicle by the camera device.

3. The method of claim 1, wherein:

the first optical perspective provides the camera device with a view of one of a top portion, a front portion, a rear portion, and a side portion of the vehicle; and the second optical perspective provides the camera device with a view of a different one of a top portion, a front portion, a rear portion, and a side portion of the vehicle.

4. The method of claim 1, wherein the surface is positioned partially within a field of view of the camera device such that:

the first optical perspective is obtained from a first subset of the field of view that is unaffected by the surface; and the second optical perspective is obtained from a second subset of the field of view that reflects off of the surface, wherein the second subset differs from the first subset.

5. The method of claim 4, wherein capturing the first image and capturing the second image comprise:

capturing a single image at a single time such that the single image comprises a first region displaying the vehicle from the first optical perspective and a second region displaying the vehicle from the second optical perspective.

6. The method of claim 4, wherein:

capturing the first image comprises capturing the first image at a first time; and capturing the second image comprises capturing the second image at a second time, wherein the second time differs from the first time.

7. The method of claim 6, wherein the camera device and the surface maintain static positions between the capturing of the first image and the capturing of the second image.

8. The method of claim 1, further comprising:

capturing the first image at a first time;

capturing the second image at a second time, wherein the second time differs from the first time; and causing the surface to change from one of a reflective state to a transparent state and a transparent state to a reflective state such that:

the first optical perspective is obtained via a direct view through the surface during the first time; and the second optical perspective is obtained via reflection off of the surface during the second time.

9. The method of claim 8, wherein the camera device and the surface maintain static positions between the capturing of the first image and the capturing of the second image.

10. The method of claim 1, further comprising:

capturing the first image at a first time;

capturing the second image at a second time, wherein the second time differs from the first time; and causing one or more of the camera device or the surface to move such that:

the first optical perspective is obtained via a view that is unaffected by the surface during the first time; and the second optical perspective is obtained via reflection off of the surface during the second time.

11. The method of claim 1, wherein determining characteristics of the vehicle comprises:

determining one of a license plate identification, a passenger configuration, a vehicle classification, and a speed of the vehicle by analyzing the first image; and determining a different one of a license plate identification, a passenger configuration, a vehicle classification, and a speed of the vehicle by analyzing the second image.

12. The method of claim 1, wherein determining characteristics of the vehicle comprises:

determining a characteristic of the vehicle by comparing the first image to the second image, wherein the characteristic of the vehicle comprises one of a license plate identification, a passenger configuration, a vehicle classification, and a speed of the vehicle.

13. The method of claim 12, further comprising:

determining a first position of the vehicle at a first time by analyzing the first image;

determining a second position of the vehicle at a second time by analyzing the second image; and determining the speed of the vehicle by comparing the first position of the vehicle at the first time to the second position of the vehicle at the second time.

14. The method of claim 1, wherein determining characteristics of the vehicle comprises:

determining a first estimation of a characteristic of the vehicle by analyzing the first image, wherein the characteristic of the vehicle comprises one of a license plate identification, a passenger configuration, a vehicle classification, and a speed of the vehicle;

determining a second estimation of the characteristic of the vehicle by analyzing the second image; and determining a third estimation of the characteristic of the vehicle by combining the first estimation and the second estimation.

15. The method of claim 1, wherein:

capturing the first image comprises illuminating the vehicle using a first illumination device that illuminates the vehicle when viewed from the first optical perspective; and capturing the second image comprises illuminating the vehicle using a second, different illumination device that illuminates the vehicle when viewed from the second optical perspective.

16. The method of claim 1, further comprising:

illuminating the vehicle using a plurality of illumination devices surrounding the camera device such that the plurality of illumination devices emit a combined path of illumination that is substantially coaxial with a field of view of the camera device.

17. A method of monitoring traffic using a single camera device, the method comprising:

capturing a first image of a vehicle at a first time using the camera device, wherein the first image displays a first portion of the vehicle from a first optical perspective; and capturing a second image of the vehicle at a second time using the camera device, wherein the second image displays a second portion the vehicle from a second optical perspective, wherein:

the second time differs from the first time; and the second portion of the vehicle differs from the first portion of the vehicle;

causing a surface external to the camera device to change from one of a reflective state to a transparent state and a transparent state to a reflective state such that:

the first optical perspective is obtained via a direct view through the surface during the first time; and the second optical perspective is obtained via reflection off of the surface during the second time;

wherein the camera device and the surface maintain static positions between the capturing of the first image and the capturing of the second image;

determining one of a license plate identification and a speed of the vehicle by analyzing the first image;

determining a different one of a license plate identification and a speed of the vehicle by analyzing the second image; and associating the determined license plate identification of the vehicle with the determined speed of the vehicle.

18. A method of monitoring traffic using a single camera device, the method comprising:

capturing a first image of a vehicle using the camera device, wherein the first image displays the vehicle from a first optical perspective that provides the camera device with a view of one of a top portion, a front portion, a rear portion, and a side portion of the vehicle; and capturing a second image of the vehicle using the camera device, wherein the second image displays the vehicle from a second optical perspective, wherein:

the second optical perspective provides the camera device with a view of a different one of the top portion, the front portion, the rear portion, and the side portion of the vehicle than the first optical perspective; and the second optical perspective is obtained via reflection off of a surface external to the camera device; and determining characteristics of the vehicle by analyzing the first image and the second image.

19. The method of claim 18, wherein the first optical perspective is obtained via a direct view of the vehicle by the camera device.

* * * * *